United States Patent
Jentsch

(10) Patent No.: US 8,473,527 B2
(45) Date of Patent: Jun. 25, 2013

(54) AUTOMATIC GENERATION OF WHERE-USED INFORMATION

(75) Inventor: Frank Jentsch, Muchlhausen (DE)

(73) Assignee: SAP AG, Walldorf (DE)

( * ) Notice: Subject to any disclaimer, the term of this patent is extended or adjusted under 35 U.S.C. 154(b) by 94 days.

(21) Appl. No.: 12/953,322

(22) Filed: Nov. 23, 2010

(65) Prior Publication Data

US 2012/0131059 A1    May 24, 2012

(51) Int. Cl.
 *G06F 7/00* (2006.01)
 *G06F 17/30* (2006.01)
(52) U.S. Cl.
 USPC ............................... 707/803; 717/120
(58) Field of Classification Search
 USPC ................... 707/802, 803; 717/120
 See application file for complete search history.

(56) References Cited

U.S. PATENT DOCUMENTS

| | | | |
|---|---|---|---|
| 2007/0130173 A1* | 6/2007 | Lunev et al. | 707/100 |
| 2009/0150866 A1* | 6/2009 | Schmidt | 717/120 |
| 2009/0150906 A1* | 6/2009 | Schmidt et al. | 719/317 |

* cited by examiner

*Primary Examiner* — Cam Truong
(74) *Attorney, Agent, or Firm* — Mintz Levin Cohn Ferris Glovsky and Popeo, P.C.

(57) ABSTRACT

To enable automated updating of a where-used list for data elements in a software solution, an unindexed data element of a plurality of data elements included in the software solution can be detected. The unindexed data element can have a non-current or non-existent where-used listing in the current where-used list. A set of rules that can include a predefined dependency condition defining a unidirectional dependency relationship condition existing between instances of a first type of data structure and a second type of data structure in the software solution can be applied to the unindexed data element. The applying can include identifying the unindexed data element as including the second type of data structure and at least one other data element in the plurality of data elements as including the first type of data structure and therefore having at least one dependency on the unindexed data element. The current where-used list can be updated to create an updated where-used list that includes a listing of the at least one dependency for the unindexed data element.

20 Claims, 4 Drawing Sheets

AUTOMATIC GENERATION OF WHERE-USED INFORMATION

TECHNICAL FIELD

The subject matter described herein relates to generating where-used information for data elements, for example in a software solution.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

Many modern business software systems, including but not limited to ERP software system can be built upon metadata, which is generally defined as data that describes or otherwise provides information about other data. One type of metadata can include information regarding data elements of a data structure upon which a given data element has a dependency. The term data element, as used herein, can refer to any data format, including but not limited to a data object or business object, a node or a root node of a data or business object, and the like. The term dependency, as used herein, can refer to any unidirectional relationship between data elements, in which a dependent data element accesses data, metadata, data formats or structures, or the like from a depended upon data element.

As an example, a data element, such as a data object node, can be both a parent data object node and a child data object node in a web of inter-nodal dependencies and can depend on any number of child data object nodes and have any number of parent data object nodes that depend upon it. In a typical business software system, metadata can be distributed into meta-objects. A where-used list can be necessary to ensure metadata consistency and to make dependencies between meta-object instances transparent. As used herein, the term "where-used data" refers to an index, listing, or the like that contains information pertaining to associations or dependencies between data elements, for example data objects, nodes, or the like, of an object-based software solution.

A where-used listing can be necessary useful in resolving the typically one-way nature of inter-element dependencies. The data objects or data elements that depend upon data or data elements in a given data object are usually not known to or stored within that given data object. Currently available approaches to retaining a record of the web of inter-dependencies and associations that can arise in an complex object-based system is to hard-program an index of these dependencies, associations, or references. Such an approach can be effective in a static application environment or one that does not allow for customized features that are not included in an "off-the-shelf" version of the application. However, in a customizable software solution, the set of dependencies in each instance of the software solution can differ based on the specific business processes of an organization that the instance of the software solution is customized to support. Hard-programmed where-used listings are therefore not able to support the customizations of such a software solution.

SUMMARY

In one aspect, in a computer-implemented method, at least one unindexed data element of a plurality of data elements included in a software solution is detected. The unindexed data element has a non-current or non-existent where-used listing in a current where-used list for the software solution. A set of rules that includes a predefined dependency condition defining a unidirectional dependency relationship condition existing between instances of a first type of data structure and a second type of data structure in the software solution is applied to the unindexed data element. The applying includes identifying the unindexed data element as including the second type of data structure and at least one other data element in the plurality of data elements as including the first type of data structure and therefore having at least one dependency on the unindexed data element. The current where-used list is updated to an updated where-used list that includes a listing of the at least one dependency for the unindexed data element.

In some variations one or more of the following features can optionally be included. A definition of a new unidirectional dependency relationship condition between instances of a third type of data structure and at least one of the first type of data structure and the second type of data structure in the software solution can be received and added to the set of rules. The software solution can include a customized software solution hosted on a tenant of a multi-tenant software architecture providing access to a plurality of tenants that comprises the tenant. The multi-tenant software architecture can include an application server providing access for each of a plurality of organizations to at least one organization-specific tenant of the plurality of tenants and a data repository including tenant-independent content that is common to all of the plurality of tenants and tenant-specific content for each of the plurality of organizations. The tenant-specific content for each of the plurality of tenants can be accessible to and modifiable by only a corresponding organization of at least one organization. The tenant-independent content can include at least one of core software platform content representing core functionality of a core software platform upon which the manually configured customized software instance is based, and system content created by the runtime of the core software platform. The core software platform content can non-modifiable by the tenant, and the system content can include a core data object that is modifiable with data provided by the tenant during runtime.

The set of rules can include a tenant-independent subset of rules including abstract definitions of dependencies between types of data structures occurring in the core software platform content and the system content and a tenant-dependent subset of rules for at least one of the plurality of tenants. The tenant-dependent set of rules can include abstract definitions of dependencies between types of data structures occurring in the tenant content and the types of data structures occurring in any of the core software platform content, the system content, and the tenant content. The updated where-used list can include a tenant-independent sub-list indexing dependencies between data elements in the core software platform content and the system content and other data elements in the core software platform content 402 and the system content. The updated where-used list can also include a tenant-dependent sub-list for at least one of the plurality of tenants. The tenant-dependent sub-list can index dependencies between data elements in the tenant content and other data elements in any of the core software platform content, the system content, and the tenant content. The unindexed data element can include at least one of a child node in a parent-child association, a first root node of a business object, and a first other node of the business object, and the unidirectional dependency relationship condition can include at least one of an intra-business object dependency and an inter-business object dependency.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Implementations of the current subject matter can provide one or more of the following, non-exhaustive list of potential advantages. For example, dynamic changes to dependencies between data objects in a software solution can be conveniently incorporated into an updated where-used list for the software solution.

It should be noted that, while the descriptions of specific implementations of the current subject matter discuss delivery of enterprise resource planning software to multiple organizations via a multi-tenant system, the current subject matter is applicable to other types of software and data services access as well. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address the above-noted and potentially other issues, one or more implementations of the current subject matter provide methods, systems, articles or manufacture, and the like that can, among other possible advantages, provide one or more algorithms and other approaches, that are not unique to a specific set of dependencies, and that can determine where-used information for data object nodes using information of an underlying meta-meta-model. The meta-meta-model can include metadata about metadata or in other words, information about or characterizing other metadata that itself includes information about or otherwise characterizing data elements and/or structures of a software solution. A meta-meta-model can represent a unidirectional association between meta-data objects in a manner that allows resolution of dependencies between data elements in a reverse direction to the unidirectionality of typical inter-element dependencies. Meta-models can be created and enhanced using associations that can be interpreted during design-time to derive a complete or at least partial where-used list for data object nodes in a business software system. In various implementations, specific calculation of dependencies need not be performed.

In some implementations, a central generic or universal algorithm can be used to dynamically calculate where-used information at runtime, for example automatically upon detection of a modification of one or more dependencies between data elements in a software solution. Content for a where-used list can in some implementations be re-calculated automatically or periodically after meta-model enhancements. A specific, hard-coded or hard-programmed mapping need not be provided for each dependency in the software solution. In some implementations, where-used data can be retained as a map of the locations of all references to or uses of the data or data elements in any instance of any data object or other data structure.

Figure 1:
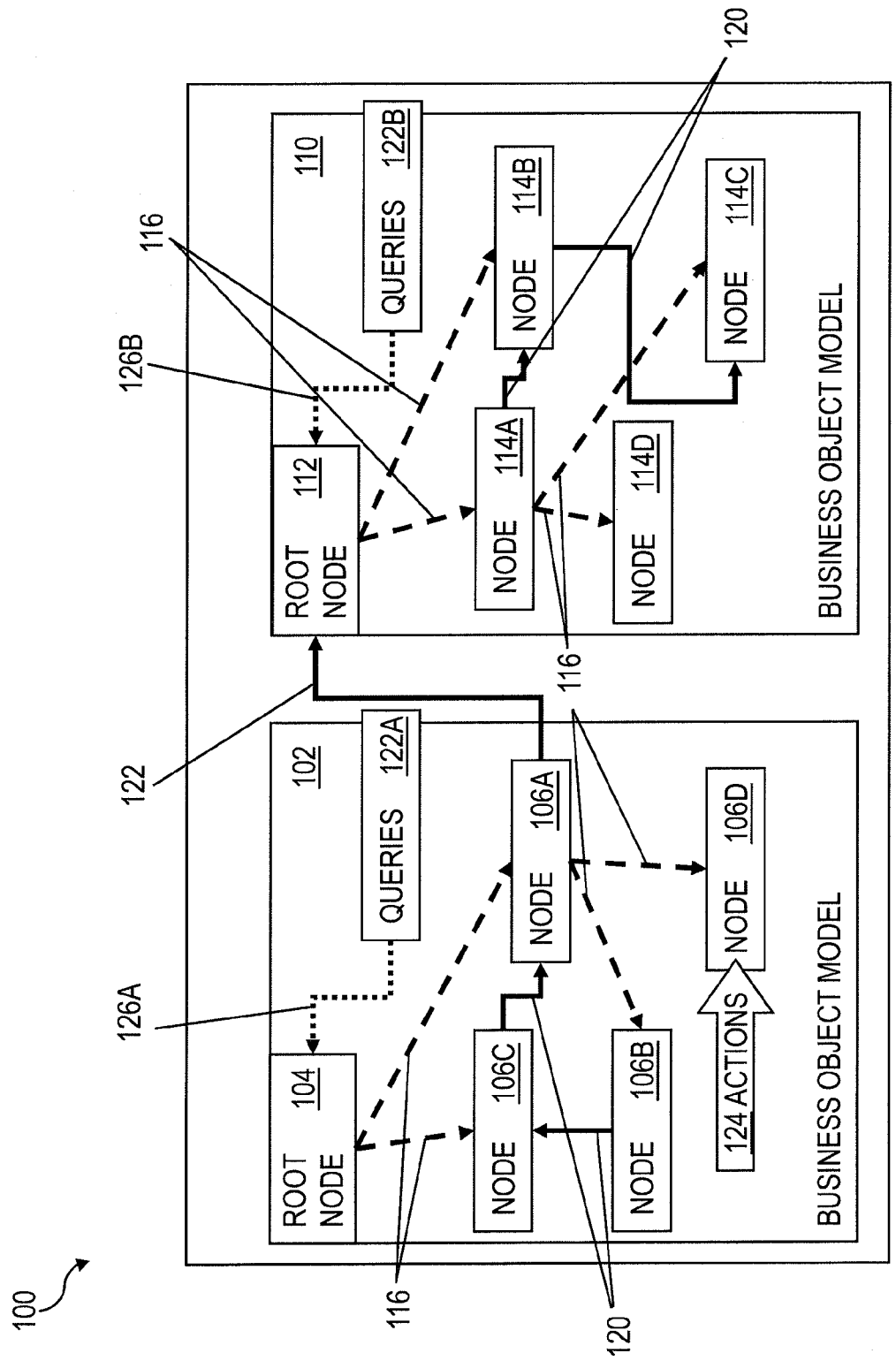
FIG. 1 is a diagram showing examples of types of data elements and dependencies between data elements.

FIG. 1 illustrates some examples of dependencies between data elements in a composition hierarchy of a software solution. As shown in FIG. 1, a first data object 102, which can be a business object, can include a first root node 104 as well as one or more first other nodes 106A, 106B, 106C, and 106D that are structured in a composition hierarchy. A second data object A10, which can also be a business object, can include a second root node 112 as well as one or more second other nodes 114A, 114B, 114C, and 114D that are also structured in the composition hierarchy.

Each node (including the root nodes 102 and 112 and the other nodes 106 and 114) can have one composition association to its parent node and one or more than one composition association child nodes. In FIG. 1, parent-child associations, which are one possible kind of dependency, are shown as dashed arrows 116. In addition, the nodes can have intra-object associations 120 and cross-object associations 122 that link a node of the first data object 102 to a node of the second data object 110. In FIG. 1, associations between nodes, both intra-object associations A20 and cross-object associations A22, which are another possible kind of dependency, are shown as solid arrows. FIG. 1 shows one of the first other nodes 106A of the first data object 102 having a cross-object association 122 with the root node 112 of the second data object 110, another first other node 106B of the first data object 102 having an intra-object association 120 with another first other node 106C of the first data object 102, which in turn has an intra-object association 120 with the first other node 106A, and a second other node 114A of the second data object 110 having an intra-object association 120 with another second other node 114B of the second data object 110 which in turn has an intra-object association 120 with yet another second other node 114C of the second data object 110. Other types of cross-object associations are possible, including associations between a root node of one data object and a non-root node of a second data object and associations between another node of one data object and another node of the second data object. Other types of intra-object associations are also possible, for example between a root node of one data object and another node of another data object.

A data object 102, 110 can also include one or more queries 122 and actions 124 that can act upon the other elements of the data object. For example, as shown in FIG. 1, the first data object 102 includes an action 124 that is executed upon one of the first other nodes 106D. Also as shown in FIG. 1, the first data object 102 and the second data object 110 include queries 122A and 122B that can generate query results 126A and 126B, respectively. In some implementations, actions and queries can also be examples of dependencies.

Dependencies can be unidirectional as noted above. In other words, a data element depending on another data element can include information about or some other indication of the dependency, but the other data element does not necessarily include any information about or some other indication of the dependency. As such, while a "top down" hierarchy of dependencies can be easily traced by referring to each data element and determining which other data element or data elements it depends upon, the reverse is not true, so assembly of a "bottom-up" index that indicates for each data element the other data elements that depend upon that data element can present a challenge.

In some implementations, the current subject matter can enable the automated creation of where-used lists for data elements using a set of rules or other abstractions that identify or designate at least a first type of data element that depends on or is associated with a second type of data element. These rules or abstractions can be generated as a meta-meta-model for the data elements in an object oriented software architecture. The meta-model can include metadata that indicates one or more types of data elements upon which a specific type of data object generally depends or is otherwise associated with.

Figure 2:
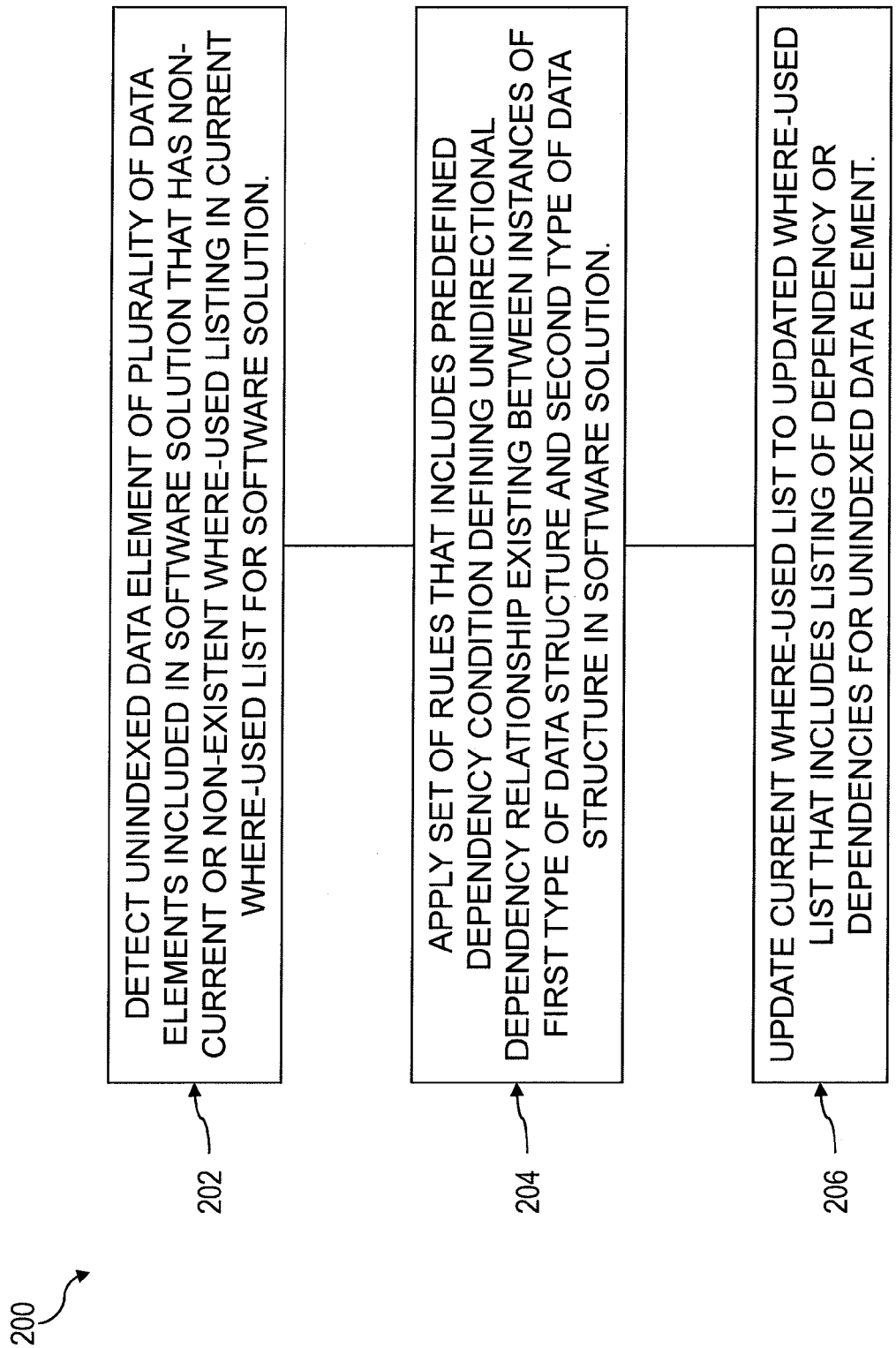
FIG. 2 is a process flow diagram illustrating a method.

FIG. 2 shows a process flow chart illustrating a method consistent with implementations of the current subject matter. At 202, at least one unindexed data element of a plurality of data elements included in a software solution can be detected. The at least one unindexed data element has a non-current or non-existent where-used listing in a current where-used list for the software solution. A set of rules that includes a predefined dependency condition defining a unidirectional dependency relationship condition existing between instances of a first type of data structure and a second type of data structure in the software solution can be applied to the unindexed data element at 204. The applying of the set of rules can include identifying the unindexed data element as including the second type of data structure and at least one other data element in the plurality of data elements as including the first type of data structure and therefore having at least one dependency on the unindexed data element. The current where-used list can be updated at 206 to an updated where-used list that includes a listing of the at least one dependency for the unindexed data element.

As an illustrative example, the first type of data structure can be a business object related to a purchase order. The second type of data structure can be a data object or other data structure that includes a customer address, information about product configuration or pricing, or any other data that can be pulled into an instance of a purchase order via the purchase order business object. While the purchase order business object includes metadata indicating what types of data from what types of data structures are necessary to populate an instance of the purchase order, each individual data element upon which the purchase order business object can depend is likely to include metadata indicating these dependencies. Implementations of the current subject matter provide for the use of a set of rules that define dependencies between data elements based on the type of data structure that each data element is or is a part of.

Upon receipt of a definition of a new unidirectional dependency relationship condition between instances of, for example, a third type of data structure and at least one of the first type of data structure and the second type of data structure in the software solution, the definition can be added to the set of rules.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized software solutions that are tailored to each of multiple organization's business processes. In some implementations, one or more features of the current subject matter as described herein can be used in conjunction with such a system to enable rapid updating of where-used lists for multiple tenants that each support a customized software solution. The term tenant, as used herein, refers to a software solution that is tailored for users of an organization. The tenant can in some implementations be hosted on a dedicated computing system including one or more programmable processors. Alternatively, as discussed in greater detail below, a tenant can be hosted by a computing system that hosts a plurality of tenants. Such a computing system can include one or more programmable processors. Tenants of the plurality of tenants can provide customized software instances of a core software platform such that each of the tenants and its customizations are accessible only to one organization of potentially multiple organizations having access to the computing system.

Figure 3:
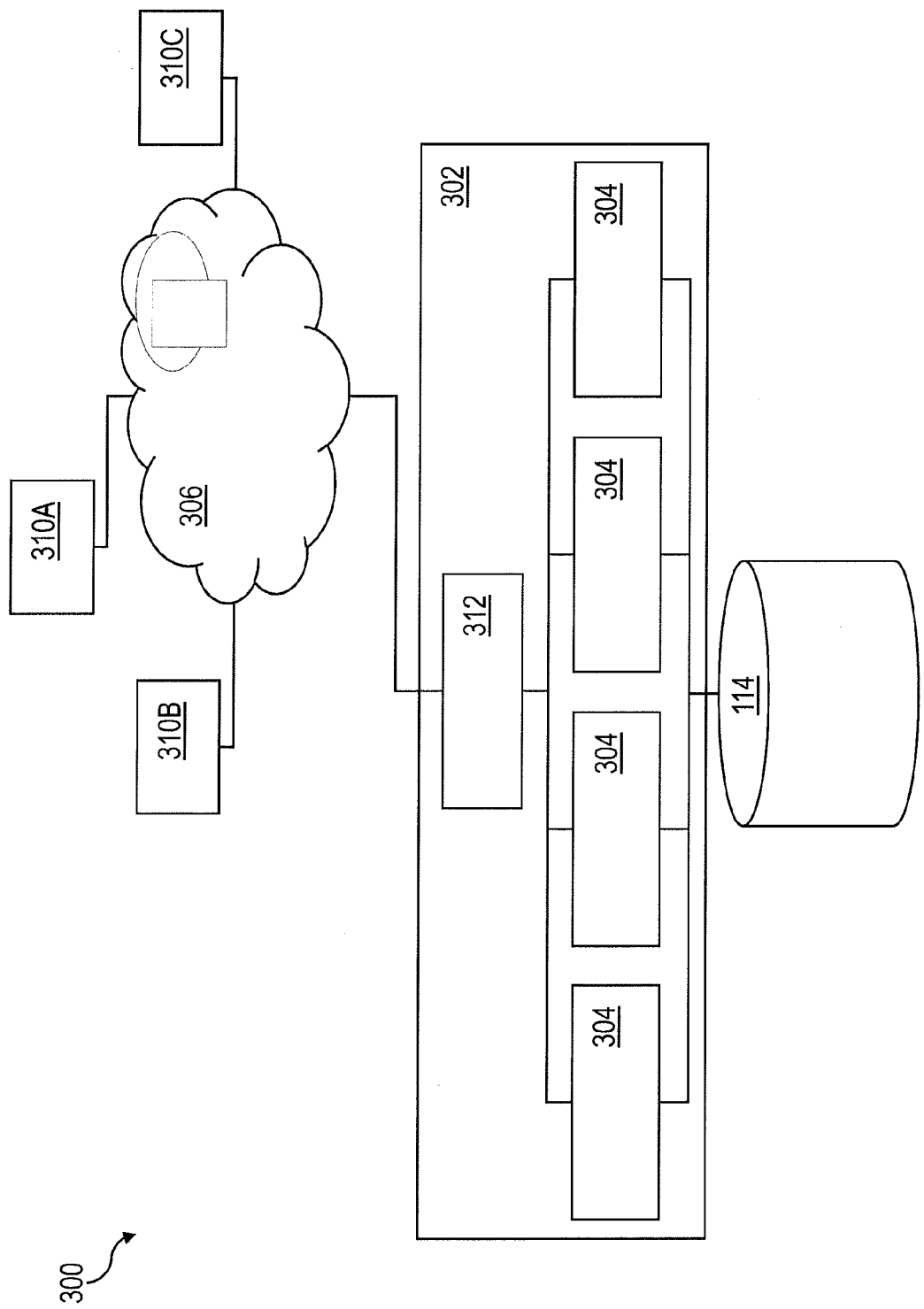
FIG. 3 is a diagram showing an example of a multi-tenant approach to providing customized software services to multiple organizations from a single architecture.

FIG. 3 shows a block diagram of a multi-tenant implementation of a software delivery architecture 300 that includes an application server 302, which can in some implementations include multiple server systems 304 that are accessible over a network 306 from client machines operated by users at each of multiple organizations 310A-310C (referred to herein as "tenants" of a multi-tenant system) supported by a single software delivery architecture 300. For a system in which the application server 302 includes multiple server systems 304, the application server can include a load balancer 312 to distribute requests and actions from users at the one or more organizations 310A-310C to the one or more server systems 304. A user can access the software delivery architecture across the network using a thin client, such as for example a web browser or the like, or other portal software running on a client machine. The application server 302 can access data and data objects stored in one or more data repositories 314.

Figure 4:
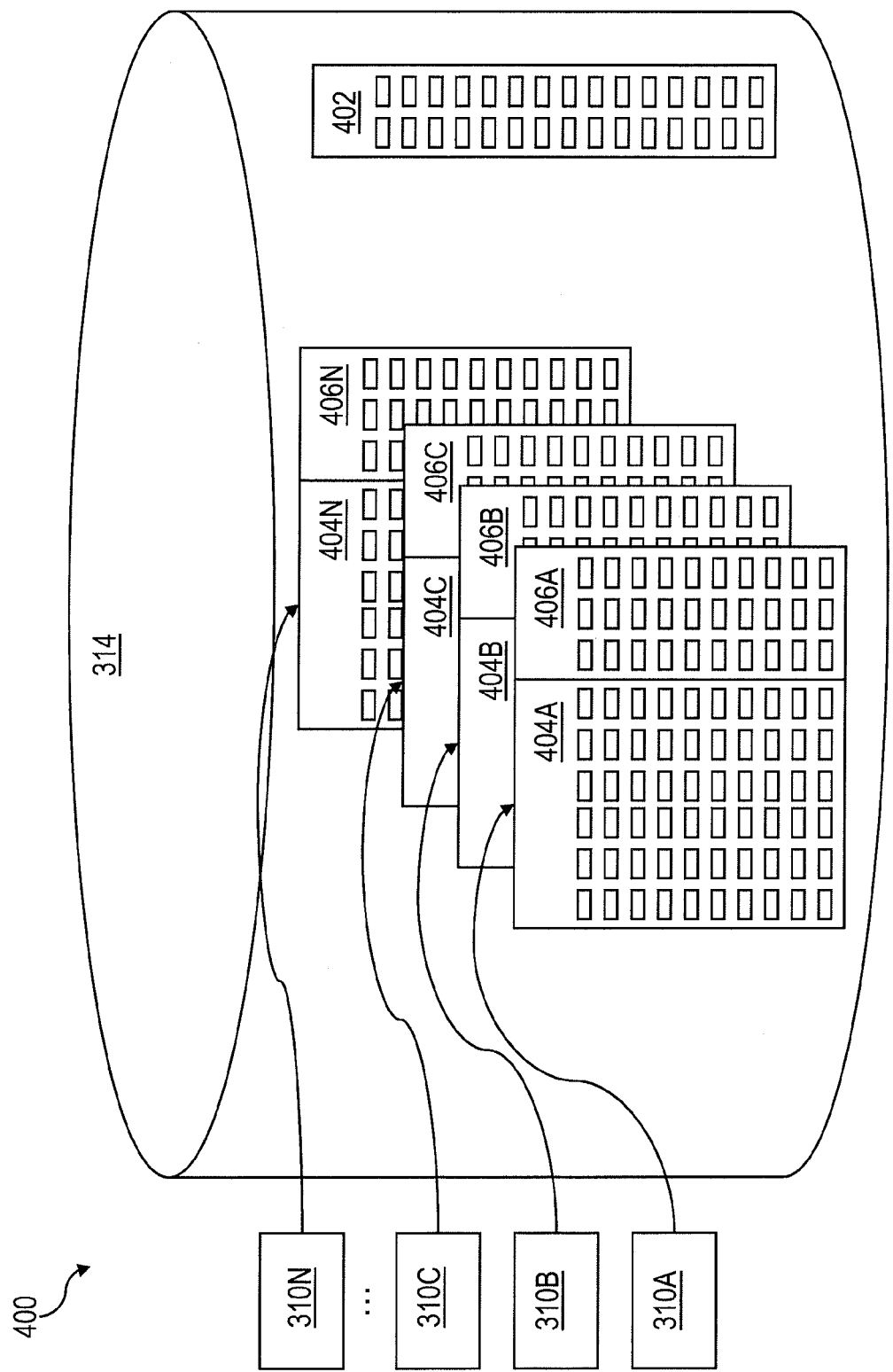
FIG. 4 is a diagram showing storage of both core software package data objects and tenant-specific data objects for each of multiple tenants of a multi-tenant system.

To provide for customization of the core software platform for each of multiple organizations supported by a single software delivery architecture 300, the data and data objects stored in the repository or repositories 314 that are accessed by the application server 302 can include three types of content as shown in FIG. 4: core software platform content 402, system content 404, and tenant content 406. Core software platform content 402 includes content that represents core functionality and is not modifiable by a tenant. System content 404 can in some examples be created by the runtime of the core software platform and can include core data objects that are modifiable with data provided by each tenant. For example, if the core software platform is an ERP system that includes inventory tracking functionality, the system content 404A-404N can include data objects for labeling and quantifying inventory. The data retained in these data objects are tenant-specific: for example, each tenant 310A-310N stores information about its own inventory. Tenant content 406A-406N includes data objects or extensions to other data objects that are customized for one specific tenant 310A-310N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 406 can include condition records in generated condition tables, access sequences, price calculation results, or any other tenant-specific values. A combination of the software platform content 402 and system content 404 and tenant content 406 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 302 that includes multiple server systems 304 that handle processing loads distributed by a load balancer 312. Potential benefits from such an arrangement can include, but are not limited to, high and reliably continuous application server availability and minimization of unplanned downtime, phased updating of the multiple server systems 304 to permit continuous availability (one server system 304 can be taken offline while the other systems continue to provide services via the load balancer 312), scalability via addition or removal of a server system 304 that is accessed via the load balancer 312, and de-coupled lifecycle processes (such as for example system maintenance, software upgrades, etc.) that enable updating of the core software independently of tenant-specific customizations implemented by individual tenants.

According to implementations of the current subject matter, a set of rules can be stored in the repository 114 or in another repository accessible to the application server of a software architecture, for example one including one or more features of the architecture described in relation to FIG. 3 and FIG. 4. The set of rules can be used as described above to update a where-used list providing a transparent index of dependencies between data elements including those included within the core software platform content 402, system content 404, and tenant content 406. In some implementations, a global or tenant-independent where-used list can include a tenant-independent sub-list that indexes dependencies between data elements in the core software platform content 402 and the system content 404 and other data elements in the core software platform content 402 and the system content 404. A tenant-dependent sub-list for one or more or each of the tenants 310 can index dependencies between data elements in the tenant content 406 and other data elements in any of the core software platform content 402, the system content 404, and the tenant content 406.

Similarly, the set of rules can include a global or tenant-independent subset of rules that can be modified by addition or subtraction of abstract definitions of dependencies between types of data structures occurring in the core software platform content 402 and the system content 404. The set of rules can also include a tenant-dependent subset of rules for one or more or each tenant 310. A tenant-dependent subset of rules can be modified by addition or subtraction of abstract definitions of dependencies between types of data structures occurring in the tenant content and types of data structures occurring in any of the core software platform content 402, the system content 404, and the tenant content 406.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory, machine-readable medium storing instructions that, when executed by at least one processor, cause the at least one processor to perform operations comprising:

detecting at least one unindexed data element of a plurality of data elements included in a software solution, the at least one unindexed data element having a non-current or non-existent where-used listing in a current where-used list for the software solution;

applying, to the unindexed data element, a set of rules comprising a predefined dependency condition defining a unidirectional dependency relationship condition existing between instances of a first type of data structure and a second type of data structure in the software solution, the applying comprising identifying the unindexed data element as comprising the second type of data structure and at least one other data element in the plurality of data elements as comprising the first type of data structure, the at least one other data element therefore having at least one dependency on the unindexed data element; and updating the current where-used list to an updated where-used list that comprises, for the unindexed data element, a listing of the at least one dependency.

2. The computer program product as in claim 1, wherein the operations further comprise:

receiving a definition of a new unidirectional dependency relationship condition between instances of a third type of data structure and at least one of the first type of data structure and the second type of data structure in the software solution; and adding the definition to the set of rules.

3. The computer program product as in claim 1, wherein the software solution comprises a customized software solution hosted on a tenant of a multi-tenant software architecture providing access to a plurality of tenants that comprises the tenant, the multi-tenant software architecture comprising:

an application server providing access for each of a plurality of organizations to at least one organization-specific tenant of the plurality of tenants; and a data repository comprising tenant-independent content that is common to all of the plurality of tenants and tenant-specific content for each of the plurality of organizations, the tenant-specific content for each of the plurality of tenants being accessible to and modifiable by only a corresponding organization of at least one organization.

4. The computer program product as in claim 3, wherein the tenant-independent content comprises at least one of core software platform content representing core functionality of a core software platform upon which the manually configured customized software instance is based, and system content created by the runtime of the core software platform, the core software platform content not being tenant modifiable, the system content comprising a core data object that is modifiable with data provided by the tenant during runtime.

5. The computer program product as in claim 4, wherein the set of rules comprises:

a tenant-independent subset of rules comprising abstract definitions of dependencies between types of data structures occurring in the core software platform content and the system content; and a tenant-dependent subset of rules for at least one of the plurality of tenants, the tenant-dependent set of rules comprising abstract definitions of dependencies between types of data structures occurring in the tenant content and the types of data structures occurring in any of the core software platform content, the system content, and the tenant content.

6. The computer program product as in claim 4, wherein the updated where-used list comprises:

a tenant-independent sub-list indexing dependencies between data elements in the core software platform content and the system content and other data elements in the core software platform content 402 and the system content; and a tenant-dependent sub-list for at least one of the plurality of tenants, the tenant-dependent sub-list indexing dependencies between data elements in the tenant content and other data elements in any of the core software platform content, the system content, and the tenant content.

7. The computer program product as in claim 1, wherein the unindexed data element comprises at least one of a child node in a parent-child association, a first root node of a business object, and a first other node of the business object; and the unidirectional dependency relationship condition comprises at least one of an intra-business object dependency and an inter-business object dependency.

8. A system comprising:

at least one processor; and a computer program product comprising a machine-readable medium storing instructions that, when executed by the at least one processor, cause the at least one processor to perform operations comprising:

detecting at least one unindexed data element of a plurality of data elements included in a software solution, the at least one unindexed data element having a non-current or non-existent where-used listing in a current where-used list for the software solution;

applying, to the unindexed data element, a set of rules comprising a predefined dependency condition defining a unidirectional dependency relationship condition existing between instances of a first type of data structure and a second type of data structure in the software solution, the applying comprising identifying the unindexed data element as comprising the second type of data structure and at least one other data element in the plurality of data elements as comprising the first type of data structure, the at least one other data element therefore having at least one dependency on the unindexed data element; and updating the current where-used list to an updated where-used list that comprises, for the unindexed data element, a listing of the at least one dependency.

9. The system as in claim 8, wherein the operations further comprise:

receiving a definition of a new unidirectional dependency relationship condition between instances of a third type of data structure and at least one of the first type of data structure and the second type of data structure in the software solution; and adding the definition to the set of rules.

10. The system as in claim 8, wherein the software solution comprises a customized software solution hosted on a tenant of a multi-tenant software architecture providing access to a plurality of tenants that comprises the tenant, the multi-tenant software architecture comprising:

an application server providing access for each of a plurality of organizations to at least one organization-specific tenant of the plurality of tenants; and a data repository comprising tenant-independent content that is common to all of the plurality of tenants and tenant-specific content for each of the plurality of organizations, the tenant-specific content for each of the plurality of tenants being accessible to and modifiable by only a corresponding organization of at least one organization.

11. The system as in claim 10, wherein the tenant-independent content comprises at least one of core software platform content representing core functionality of a core software platform upon which the manually configured customized software instance is based, and system content created by the runtime of the core software platform, the core software platform content not being tenant modifiable, the system content comprising a core data object that is modifiable with data provided by the tenant during runtime.

12. The system as in claim 11, wherein the set of rules comprises:

a tenant-independent subset of rules comprising abstract definitions of dependencies between types of data structures occurring in the core software platform content and the system content; and a tenant-dependent subset of rules for at least one of the plurality of tenants, the tenant-dependent set of rules comprising abstract definitions of dependencies between types of data structures occurring in the tenant content and the types of data structures occurring in any of the core software platform content, the system content, and the tenant content.

13. The system as in claim 11, wherein the updated where-used list comprises:

a tenant-independent sub-list indexing dependencies between data elements in the core software platform content and the system content and other data elements in the core software platform content 402 and the system content; and a tenant-dependent sub-list for at least one of the plurality of tenants, the tenant-dependent sub-list indexing dependencies between data elements in the tenant content and other data elements in any of the core software platform content, the system content, and the tenant content.

14. The system as in claim 8, wherein the unindexed data element comprises at least one of a child node in a parent-child association, a first root node of a business object, and a first other node of the business object; and the unidirectional dependency relationship condition comprises at least one of an intra-business object dependency and an inter-business object dependency.

15. A computer-implemented method comprising:

detecting at least one unindexed data element of a plurality of data elements included in a software solution, the at least one unindexed data element having a non-current or non-existent where-used listing in a current where-used list for the software solution;

applying, to the unindexed data element, a set of rules comprising a predefined dependency condition defining a unidirectional dependency relationship condition existing between instances of a first type of data structure and a second type of data structure in the software solution, the applying comprising identifying the unindexed data element as comprising the second type of data structure and at least one other data element in the plurality of data elements as comprising the first type of data structure, the at least one other data element therefore having at least one dependency on the unindexed data element; and updating the current where-used list to an updated where-used list that comprises, for the unindexed data element, a listing of the at least one dependency.

16. The computer-implemented method as in claim 15, further comprising:

receiving a definition of a new unidirectional dependency relationship condition between instances of a third type of data structure and at least one of the first type of data structure and the second type of data structure in the software solution; and adding the definition to the set of rules.

17. The computer-implemented method as in claim 15, wherein the software solution comprises a customized software solution hosted on a tenant of a multi-tenant software architecture providing access to a plurality of tenants that comprises the tenant, the multi-tenant software architecture comprising:

an application server providing access for each of a plurality of organizations to at least one organization-specific tenant of the plurality of tenants; and a data repository comprising tenant-independent content that is common to all of the plurality of tenants and tenant-specific content for each of the plurality of organizations, the tenant-specific content for each of the plurality of tenants being accessible to and modifiable by only a corresponding organization of at least one organization.

18. The computer-implemented method as in claim 17, wherein the tenant-independent content comprises at least one of core software platform content representing core functionality of a core software platform upon which the manually configured customized software instance is based, and system content created by the runtime of the core software platform, the core software platform content not being tenant modifiable, the system content comprising a core data object that is modifiable with data provided by the tenant during runtime.

19. The computer-implemented method as in claim 18, wherein the set of rules comprises:

a tenant-independent subset of rules comprising abstract definitions of dependencies between types of data structures occurring in the core software platform content and the system content; and a tenant-dependent subset of rules for at least one of the plurality of tenants, the tenant-dependent set of rules comprising abstract definitions of dependencies between types of data structures occurring in the tenant content and the types of data structures occurring in any of the core software platform content, the system content, and the tenant content.

20. The computer-implemented method as in claim 18, wherein the updated where-used list comprises:

a tenant-independent sub-list indexing dependencies between data elements in the core software platform content and the system content and other data elements in the core software platform content and the system content; and a tenant-dependent sub-list for at least one of the plurality of tenants, the tenant-dependent sub-list indexing dependencies between data elements in the tenant content and other data elements in any of the core software platform content, the system content, and the tenant content.

* * * * *